(12) United States Patent
Rigby

(10) Patent No.: US 7,128,712 B2
(45) Date of Patent: Oct. 31, 2006

(54) ADAPTIVE ULTRASOUND IMAGING SYSTEM

(75) Inventor: Kenneth Wayne Rigby, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/872,864

(22) Filed: Jun. 21, 2004

(65) Prior Publication Data
US 2005/0283077 A1    Dec. 22, 2005

(51) Int. Cl.
*A61B 8/00*    (2006.01)

(52) U.S. Cl. ..................................... 600/447
(58) Field of Classification Search .......... 600/443, 600/447, 454–457; 128/916; 73/625–626
See application file for complete search history.

(56) References Cited

U.S. PATENT DOCUMENTS

| | | | |
|---|---|---|---|
| 4,989,143 A | 1/1991 | O'Donnell et al. | |
| 5,388,461 A | 2/1995 | Rigby | |
| 5,718,228 A * | 2/1998 | Hiruta et al. | 600/437 |
| 5,776,066 A * | 7/1998 | Nock et al. | 600/443 |
| 5,897,501 A | 4/1999 | Wildes et al. | |
| 6,012,458 A * | 1/2000 | Mo et al. | 600/437 |
| 6,088,295 A * | 7/2000 | Altes | 367/103 |
| 6,106,470 A | 8/2000 | Geiseretal et al. | |
| 6,346,079 B1 | 2/2002 | Heideretal et al. | |
| 2004/0260177 A1* | 12/2004 | Simopoulos | 600/437 |

* cited by examiner

*Primary Examiner*—Francis J. Jaworski
(74) *Attorney, Agent, or Firm*—Jean K. Testa; Donald S. Ingraham

(57) ABSTRACT

A method and system for operating an ultrasound system is provided. The method comprising estimating a relative motion between a transducer and an imaging subject and controlling an adaptive beamformer system in response to to an estimation of the relative motion.

34 Claims, 4 Drawing Sheets

FIG.4

ADAPTIVE ULTRASOUND IMAGING SYSTEM

BACKGROUND

The invention relates generally to ultrasound systems and more specifically to a system and method to control an adaptive beamformer system used in the ultrasound system.

Ultrasound systems comprise an array of transducer elements used for transmitting ultrasound energy into an imaging subject. The transducer array transmits ultrasound energy and receives backscattered ultrasound signals from the imaging subject to create and display an image. The backscattered signals are processed to create and display an image.

Typically, an ultrasound system comprises a transmit beamformer to transmit a beam of ultrasound energy. The ultrasound system further comprises a control processor that sends command data to beamformer system to create a beam of a desired shape. Similarly, a receive beamformer system performs time delaying and focusing operations according to the instructions from the control processor to create received beam signals. The received beam signals are then processed to generate the ultrasound image.

The ultrasonic imaging system described above assumes that there is a known, constant speed of sound in the medium through which the ultrasonic pulses are conveyed. If the sound speed is not constant, sound pulses transmitted from certain elements in the array can arrive earlier or later than expected at the desired focal point and will not properly combine with the other pulses. As a result, the net transmitted wave will not be optimally focused. Similarly, on reception, the signals on each element in the array will not be delayed optimally before summing so that the receive focusing will be degraded. If the deviations from the assumed propagation times could be measured or estimated, the ultrasound image could be improved by correcting the applied time delays for the deviations. Such an imaging system is said to contain an "adaptive" beamformer system to distinguish it from a beamformer system in which the time delays are fixed and predetermined.

One way to correct the erroneous received beam signals is by measuring the arrival time errors measured for an acoustic line in one frame and applying the measured error on the same acoustic line in the next frame. Such a method may not be entirely accurate when the transducer is moving rapidly, since in general the arrival time errors will vary with the position of the transducer with respect to the imaging subject. In addition, any adaptive beamformer system may produce image artifacts or degrade the image in other ways in some circumstances.

It is therefore desirable to design an adaptive beamformer system for use in an ultrasound system where the adaptive beamformer system may be disabled or enabled accordingly. It is further desirable to indicate to a user using the ultrasound system the state of the beamformer system and also to allow the operator to reset the beamformer system to default time delays when desirable

BRIEF DESCRIPTION

Briefly, in accordance with one aspect of the invention, a method for controlling an ultrasound system is provided. The method comprises estimating a relative motion between an array of transducer elements and an imaging subject and controlling an adaptive beamformer system in response to an estimation of the relative motion.

According to another aspect of the invention, an automatically controlled ultrasound system is provided. The ultrasound system comprises an adaptive beamformer system configured for generating the ultrasound beam and an array of transducer elements coupled to the adaptive beamformer system and configured for transmitting the ultrasound beam to an imaging subject and receiving reflected signals from the imaging subject. The ultrasound system further comprises a processing system configured for estimating a relative motion between the array of transducer elements and an imaging subject and controlling the adaptive beamformer system in response to the relative motion.

DRAWINGS

These and other features, aspects, and advantages of the present invention will become better understood when the following detailed description is read with reference to the accompanying drawings in which like characters represent like parts throughout the drawings, wherein:

FIG. 4 is a diagrammatic view illustrating an exemplary image frame divided into a plurality of rectangular blocks.

DETAILED DESCRIPTION

Figure 1:
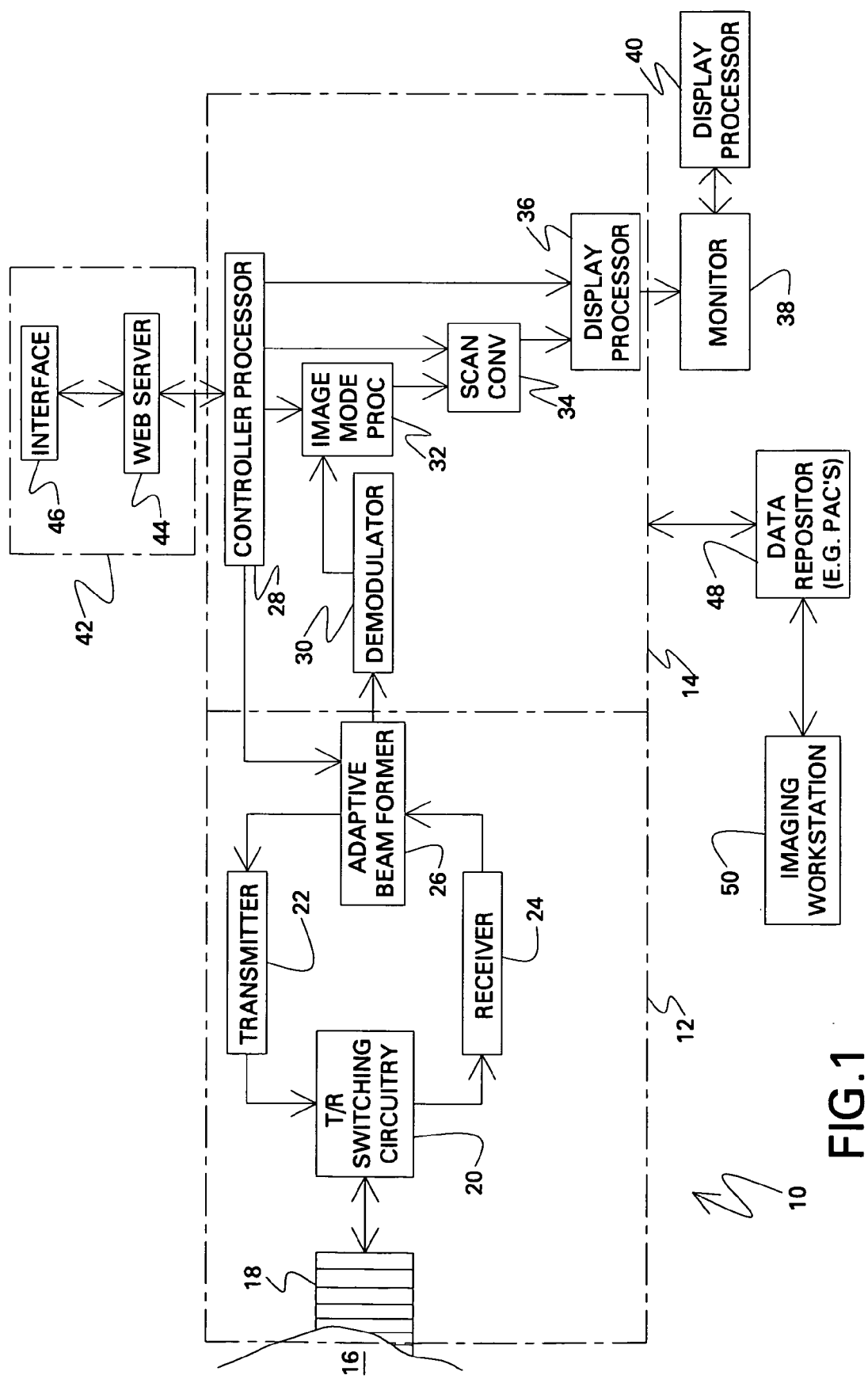
FIG. 1 is an embodiment of an exemplary ultrasound system implemented according to one aspect of the invention.

FIG. 1 is a block diagram of an embodiment of an ultrasound system 10 implemented in accordance to one aspect of the invention. The ultrasound system comprises of acquisition subsystem 12 and processing subsystem 14. The acquisition subsystem 12 comprises an array of transducer elements 18 (transducer array), transmit/receive switching circuitry 20, a transmitter 22, a receiver 24, and a beamformer 26. Processing subsystem 14 comprises a control processor 28, a demodulator 30, an imaging mode processor 32, a scan converter 34 and a display processor 36. The display processor is further coupled to a monitor for displaying images. User interface 40 interacts with the control processor and the display monitor. The control processor may also be coupled to a remote connectivity subsystem 42 comprising a web server 44 and a remote connectivity interface 46. Processing subsystem may be further coupled to data repository 48 to receive ultrasound image data. The data repository interacts with image workstation 50.

As used herein, "configured to" and the like refer to mechanical or structural connections between elements to allow the elements to cooperate to provide a described effect; these terms also refer to operation capabilities of electrical elements such as analog or digital computers or application specific devices (such as an application specific integrated circuit (ASIC)) that are programmed to perform a sequel to provide an output in response to given input signals.

The architectures and modules may be dedicated hardware elements such as circuit boards with digital signal processors or may be software running on a general-purpose computer or processor such as a commercial, off-the-shelf PC. The various architectures and modules may be combined or separated according to various embodiments of the invention.

In the acquisition subsystem 10, the transducer array 18 is in contact with imaging subject 16. The transducer 16 is coupled to the transmit/receive (T/R) switching circuitry 20. The T/R switching circuitry 20 is coupled to the output of transmitter 22 and the input of receiver 24. The output of receiver 24 is an input to adaptive beamformer 26. Adaptive beamformer 26 is further coupled to the input of transmitter 22, and to the input of demodulator 30. The adaptive beamformer is also coupled to the control processor as shown in the figure.

In processing subsystem 14, the output of demodulator 30 is coupled to an input of imaging mode processor 32. Control processor interfaces to imaging mode processor 32, scan converter 34 and to display processor 36. An output of imaging mode processor 32 is coupled to an input of scan converter 34. An output of scan converter 34 is coupled to an input of display processor 36. The output of display processor 36 is coupled to monitor 38.

Ultrasound system 10 transmits ultrasound energy into imaging subject 16 and receives and processes backscattered ultrasound signals from the subject to create and display an image. To generate a transmitted beam of ultrasound energy, the control processor 28 sends command data to the adaptive beamformer 26 to generate transmit parameters to create a beam of a desired shape originating from a certain point at the surface of the transducer array 18 at a desired steering angle.

According to one aspect of the invention, the adaptive beamformer 26 is configured to be enabled (or turned ON) and disabled (or turned OFF) based on a relative motion between the transducer and the imaging subject. The control processor is configured to send command data to enable the adaptive beamformer system when the relative motion is smaller than a threshold value. Similarly, if the relative motion is larger than the threshold value, the control processor is configured to disable the adaptive beamformer system.

In a further embodiment, the adaptive beamformer 266 is configured to be enabled or disabled based on a contact state between the transducer and the imaging subject. The manner in which the adaptive beamformer is controlled is described in further detail with respect to FIG. 2.

In a more specific embodiment, the adaptive beamformer comprises configurable connections between beamforming channels and transducer elements to support different transducer aperture sizes on each acoustic line acquisition. The adaptive beamformer system comprises a first plurality of connections between beamforming channels and the transducer elements and configured to support a first aperture size of the transducer during the enable condition. The first aperture is configured for high spatial sampling of ultrasound wavefronts.

The adaptive beamformer system further comprises a second plurality of connections between beamforming channels and the transducer elements configured to support a second aperture size during a disable condition of the adaptive beamformer system. The second aperture is configured for high focusing resolution.

In one embodiment, the first plurality of connections is made in a 1.75 D or 2 D connection topology. In another embodiment, the second plurality of connections is made in a 1 D connection topology. In an alternate embodiment, the second plurality of connections is made in a 1.5 D connection topology.

Continuing with FIG. 1, the transmit parameters are sent from the adaptive beamformer 26 to the transmitter 22. The transmitter 22 uses the transmit parameters to properly delay transmit signals to be sent to the transducer array 18 through the T/R switching circuitry 20. The transmit signals are set at certain levels and time delays with respect to each other and are provided to individual transducer elements of the transducer 18. The transmit signals excite the transducer elements to emit ultrasound waves with the same time delay and level relationships. As a result, a transmitted beam of ultrasound energy is formed in a subject within a scan plane along a scan line when the transducer 18 is acoustically coupled to the subject by using, for example, ultrasound gel. The process is known as electronic scanning.

Typically, the transducer 18 is a two-way transducer. When ultrasound waves are transmitted into a subject, the ultrasound waves are backscattered off the tissue and blood samples within the structure. The transducer 18 receives the backscattered waves at different times, depending on the distance into the tissue they return from and the angle with respect to the surface of the transducer array 18 at which they return. The transducer elements convert the ultrasound energy from the backscattered waves into electrical signals.

The received electrical signals are routed through the T/R switching circuitry 20 to the receiver 24. The receiver 24 amplifies and digitizes the received signals and provides other functions such as gain compensation. The digitized received signals correspond to the backscattered waves received by each transducer element at various times and preserve the amplitude and time delay information of the backscattered waves.

The digitized received signals are sent to adaptive beamformer 26. The control processor 28 sends command data to adaptive beamformer 26. Adaptive beamformer 26 uses the command data to form a receive beam originating from a point on the surface of transducer 18 at a steering angle typically corresponding to the point and steering angle of the previous ultrasound beam transmitted along a scan line. The adaptive beamformer 26 operates on the appropriate received signals by performing time delaying and focusing, according to the instructions of the command data from the control processor 28, to create received beam signals corresponding to sample volumes along a scan line in the scan plane within the subject. The amplitude and time delays of the received signals from the various transducer elements are used to create the received beam signals.

Thus the adaptive beamformer is configured to apply a set of time delays to the transmitted and receive signals, and also to estimate the relative arrival time error on the receive signals after the beamforming time delays have been applied. In addition, the adaptive beamformer is configured to modify the transmit and receive beamforming time delays and use the arrival time error estimates for subsequent transmit events. A default, uncorrected image is generated when the adaptive beamformer system is disabled.

The received beam signals are sent to processing subsystem 14. Demodulator 30 demodulates the received beam signals to create pairs of I and Q demodulated data values corresponding to sample volumes within the scan plane.

The demodulated data is transferred to imaging mode processor 32. Imaging mode processor 32 uses parameter estimation techniques to generate imaging parameter values from the demodulated data in scan sequence format. The imaging parameters may comprise parameters corresponding to various possible imaging modes such as, for example, B-mode, color velocity mode, spectral Doppler mode, and tissue velocity imaging mode. The imaging parameter values are passed to scan converter 34. Scan converter 34 processes the parameter data by performing a translation from scan sequence format to display format. The translation includes performing interpolation operations on the parameter data to create display pixel data in the display format.

The scan converted pixel data is sent to display processor 36 to perform any final spatial or temporal filtering of the scan converted pixel data, to apply grayscale or color to the scan converted pixel data, and to convert the digital pixel data to analog data for display on monitor 38. The interface unit 40 interacts with the control processor 28 based on the data displayed on monitor 38. The interface unit 40 is further configured to provide a user using the ultrasound system, an indicator on monitor 38 of an operative state of the adaptive beamformer system. The indicator displays to the user whether the adaptive beamformer 26 is enabled or disabled. The indicator presented to a user comprises either a visual marker, or an audible signal or combinations thereof.

As described above, the adaptive beamformer 26 is enabled and disabled based on the relative motion between the transducer and the imaging subject. One way of determining the relative motion of transducer and imaging subject is by observing pixel values in the sequence of image frames of the imaging subject 18.

The pixel value at each location in the image will generally change in each frame due to the relative motion. For example, the image pattern may move as a unit across the image pixels, either in range or azimuthally or in some combination. The translation of pixels in azimuth occurs, approximately, for example, if the operator moves the transducer across the imaging subject's skin in the same plane as the ultrasound scan. Similarly, the translation of pixels in range may occur, approximately, for example, as the imaging subject's breathing moves his or her diaphragm and with it the liver. Another change occurs when the transducer is moved perpendicularly to the scan plan, that is, in the elevational direction or when the transducer is rotated. In such cases, the pixel values will not translate across the image but will instead slowly change.

In each of the above cases, however, if the motion is relatively slow compared to the acoustic frame rate, the value of a given pixel will tend to change slowly between frames, that is, it will be correlated. The imaging subject contributing to a given pixel lies within a volume located at a fixed position relative to the transducer. The volume has dimensions roughly equal to the azimuthal beamwidth, elevational beamwidth and pulse length. When the transducer is moving, a portion of the imaging subject moves into the volume and another portion of the imaging subject moves out of the volume, at each frame. If the transducer is moving slowly, a small fraction of the volume will be different at each subsequent frame, so the change in pixel value will be small at each subsequent frame. The faster the transducer is moving, the larger the fraction of the imaging subject that is replaced in the volume and the more a given pixel value will change on average, up to the point at which all the imaging subject in the volume is replaced at each frame. At this point, the pixel values in adjacent frames will be uncorrelated. With a displacement in the azimuthal direction of about an azimuthal beamwidth per frame, the pixel values in adjacent frames will be uncorrelated. Similarly, with a displacement in the elevational direction of about an elevational beamwidth per acoustic frame, the pixel values will be uncorrelated, or with a displacement in the range direction of about a pulse width per frame.

Figure 2:
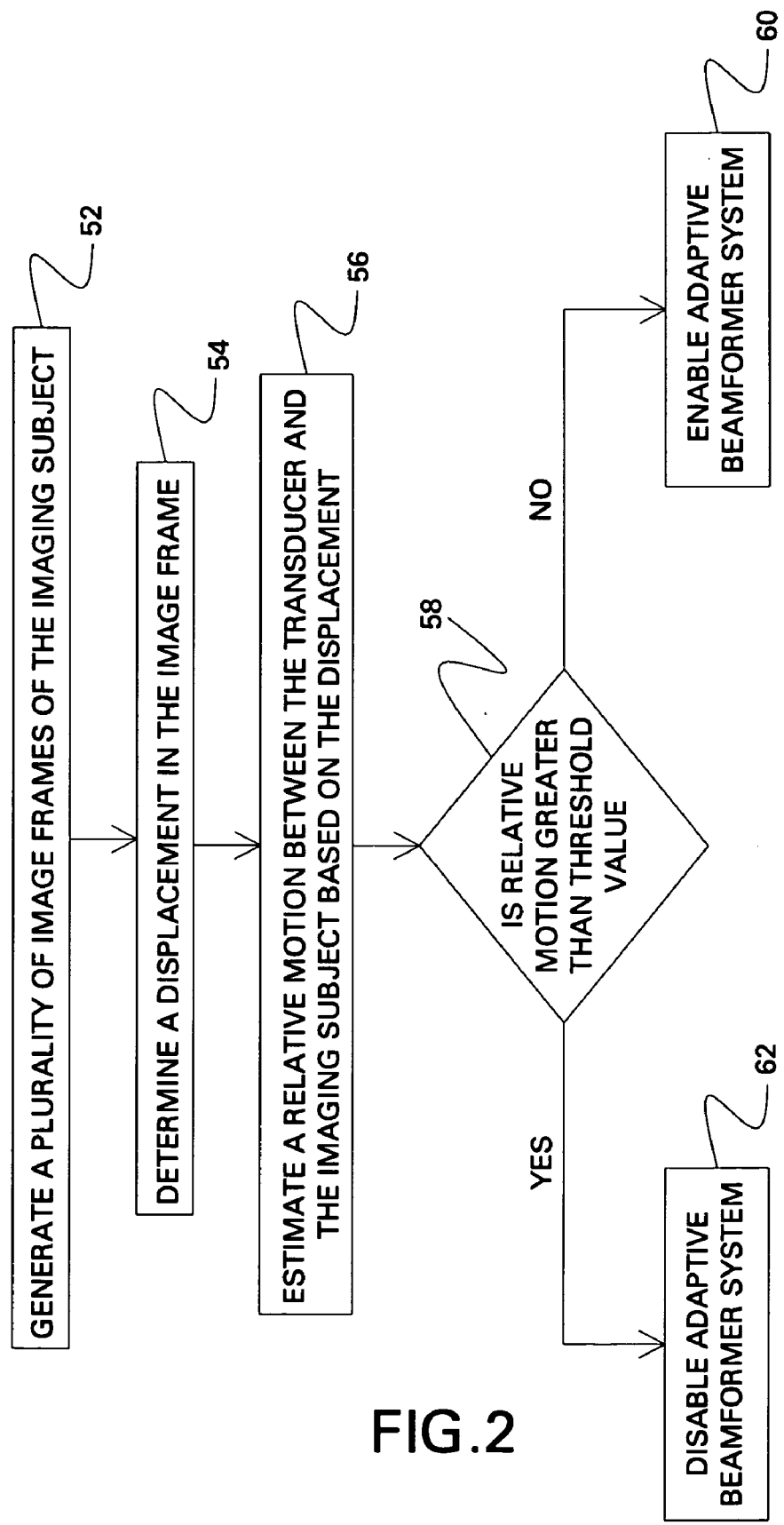
FIG. 2 is a flow chart illustrating one method by which an adaptive beamformer can be controlled.

The manner in which the measure of the relative motion is estimated is described in further detail below with reference to FIG. 2. FIG. 2 is a flow chart illustrating one method by which the adaptive beamformer 26 in ultrasound system 10 is controlled. Each step is described in further detail below.

In step 52, a plurality of image frames of the imaging subject is generated. The image frame comprises a plurality of pixels and each pixel has a corresponding pixel value.

In step 54, a relative motion between the transducer and the imaging subject occurs and a corresponding displacement in the image frame is determined. In one embodiment, the displacement is determined by comparing the pixel value of at least one pixel in a first image frame and the pixel value of the one pixel in at least one subsequent image frame. In a more specific embodiment, the first image frame and the subsequent image frame are adjacent.

In step 56, the displacement is determined by calculating a summed absolute difference. The summed absolute difference (SAD) comprises the sum of the absolute value of a difference in pixel values of at least one pixel over a pair of successive image frames. In a further embodiment, the summed absolute difference is normalized such that the SAD value lies between zero and approximately unity.

In step 58, the estimated relative motion is compared to a threshold value. If the relative motion is less than the threshold value, then the adaptive beamformer system is enabled as shown in step 60. If the relative motion is more the threshold value, then the adaptive beamformer system is disabled as shown in step 62.

Referring to step 56 of FIG. 2, the summed absolute difference value is a sum (over a set of pixel locations) of the absolute value of the difference in pixel values in successive frames. The SAD value is calculated based on the following equation.

$$S_j = \sum_{i=1}^{N} |p_j[i] - p_{j-1}[i]| \qquad \text{Equation (1)}$$

In the above equation, $S_j$ is the SAD value for the jth image frame, $p_j[i]$ is the ith pixel value in the jth frame, $p_{j-1}[i]$ is the ith pixel value in the (j−1)th frame, and the sum is over a set of N pixel values in the image.

From the discussion above, the SAD value defined by Equation 1 will tend to be small when image displacement is small and will tend to become larger as the image displacement increases. The increase in the SAD value with increasing image displacement continues until the displacement is such that the pixel values in successive frames are uncorrelated. The displacement at which the SAD value saturates is approximately equal to corresponding dimension of the resolution volume. Thus, an upper limit on the relative motion is applied which can be distinguished using Equation 1. In many cases, the upper limit is lower than desired.

The displacement at which the SAD value saturates can be increase by low-pass filtering the pixel values in each image frame. The filtering results in an increase in the correlation length of the pixel values within each image frame and thus increases the relative displacement at which the SAD value saturates. One way of filtering the image frame is to "block-average" the pixels in the image frame. As shown in block 68 of FIG. 4, the pixel values in each block are summed. The set of summed pixel values are treated as a new, smaller set of pixel values for the calculation of the SAD value. The filtered SAD value will saturate at a displacement roughly equal to the block length, which can be made much larger than the dimensions of the pixel volume. Thus the relative motion at which the SAD value saturates is increased using low-pass filtering.

Figure 4:
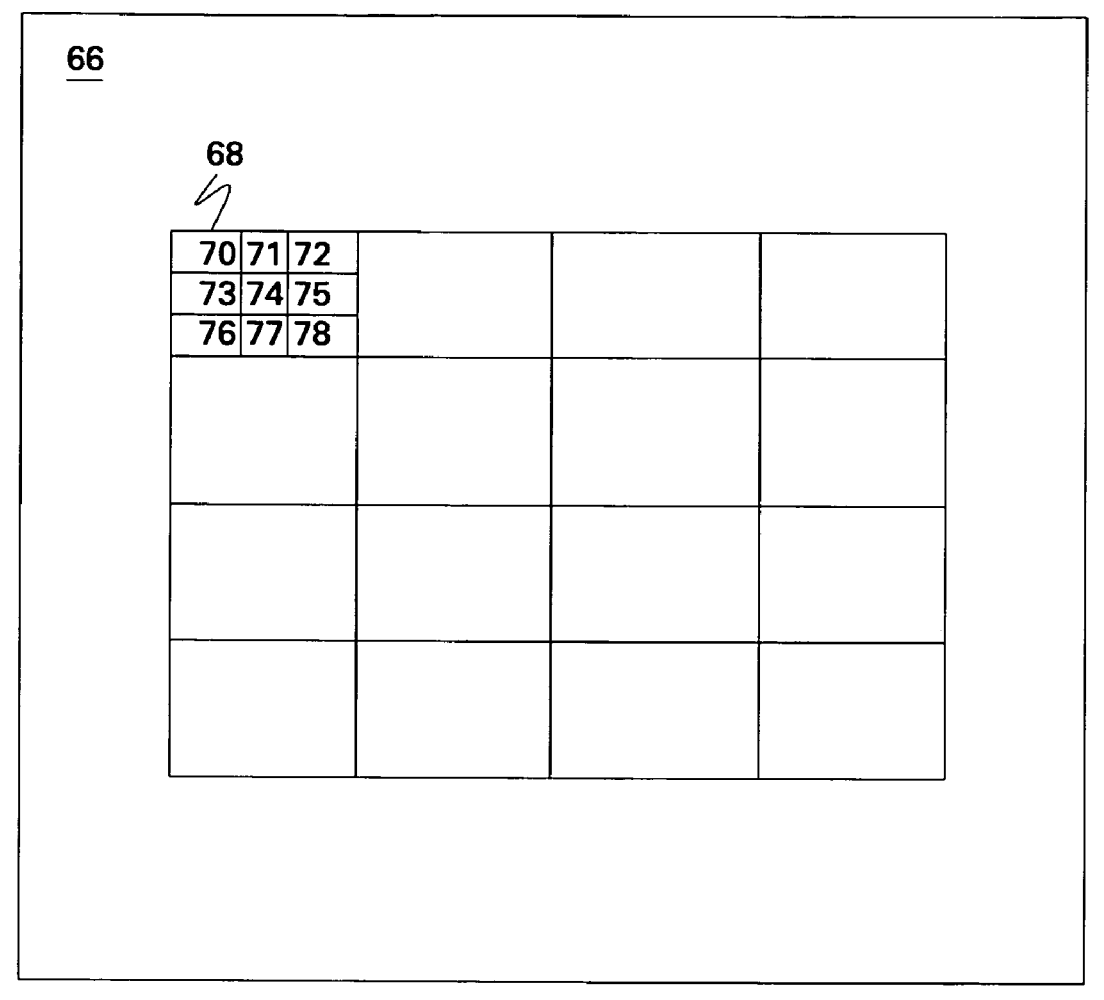

In one embodiment, the relative motion can be estimated using a SAD value calculated for pairs of consecutive image frames. A region of the image is divided into NBlock non-overlapping blocks, each block comprising M pixels. FIG. 4 illustrates an example image frame 66 comprising 16 non-overlapping blocks each containing nine pixels For example, block 68 comprises pixels 70–78

The M pixel values P in each block are summed to form NBlock block sums, $B_i$ $$B_i = \sum_{j=1}^{M} P_{ij} \quad i = 1, NBlock. \qquad \text{Equation (2)}$$

From Equation (2) the normalized, block-averaged SAD value for the kth image frame can calculated as shown in the following equation.

$$SAD_k = \frac{1}{NBlock\ \sigma^{(k)}} \sum_{i=1}^{NBlock} |B_i^{(k)} - B_i^{(k-1)}|. \qquad \text{Equation (3)}$$

where $B_i^{(k)}$ is the ith block sum for frame k and $B_i^{(k-1)}$ is the ith block sum for frame k-1, and $\sigma^{(k)}$ is the standard deviation of the block sums for frame k.

The standard deviation of the block sums is defined by the following equation.

$$\sigma = \sqrt{\frac{1}{NBlock} \sum_{i=1}^{NBlock} B_i^2 - \left(\frac{1}{NBlock} \sum_{i=1}^{NBlock} B_i\right)^2} \qquad \text{Equation (4)}$$

The normalization by the standard deviation as shown from Equations (3) and (4) makes the SAD value roughly unity for uncorrelated images. It may be appreciated that, the SAD value is zero if the pair of images are identical and that SAD value is non-negative.

As an example, consider a pair of image frames formed by shifting a single image with respect to a fixed grid of sample points. The SAD value for the pair will increase from zero as the shift increases from zero. For a shift of about the linear dimensions of the block size, and for any larger shift, the SAD value will be on average about unity. The SAD value is thus an estimate of the shift between a pair of images for shifts up to about the size of the selected block.

A threshold value may be defined to distinguish two types of relative motion between the transducer and the imaging subject. A first measure of motion is defined as a state when the SAD value is below the threshold value. In one embodiment, the first measure of motion comprises a slow moving state. A second measure of motion is defined as a state when the SAD value is above the threshold value. In one embodiment, a second measure of motion comprises a fast moving state. In one embodiment, the threshold value can be set to be about one-half, and the dimensions of the block (in azimuth and range) chosen to scale the threshold value to a desired relative motion.

Figure 3:
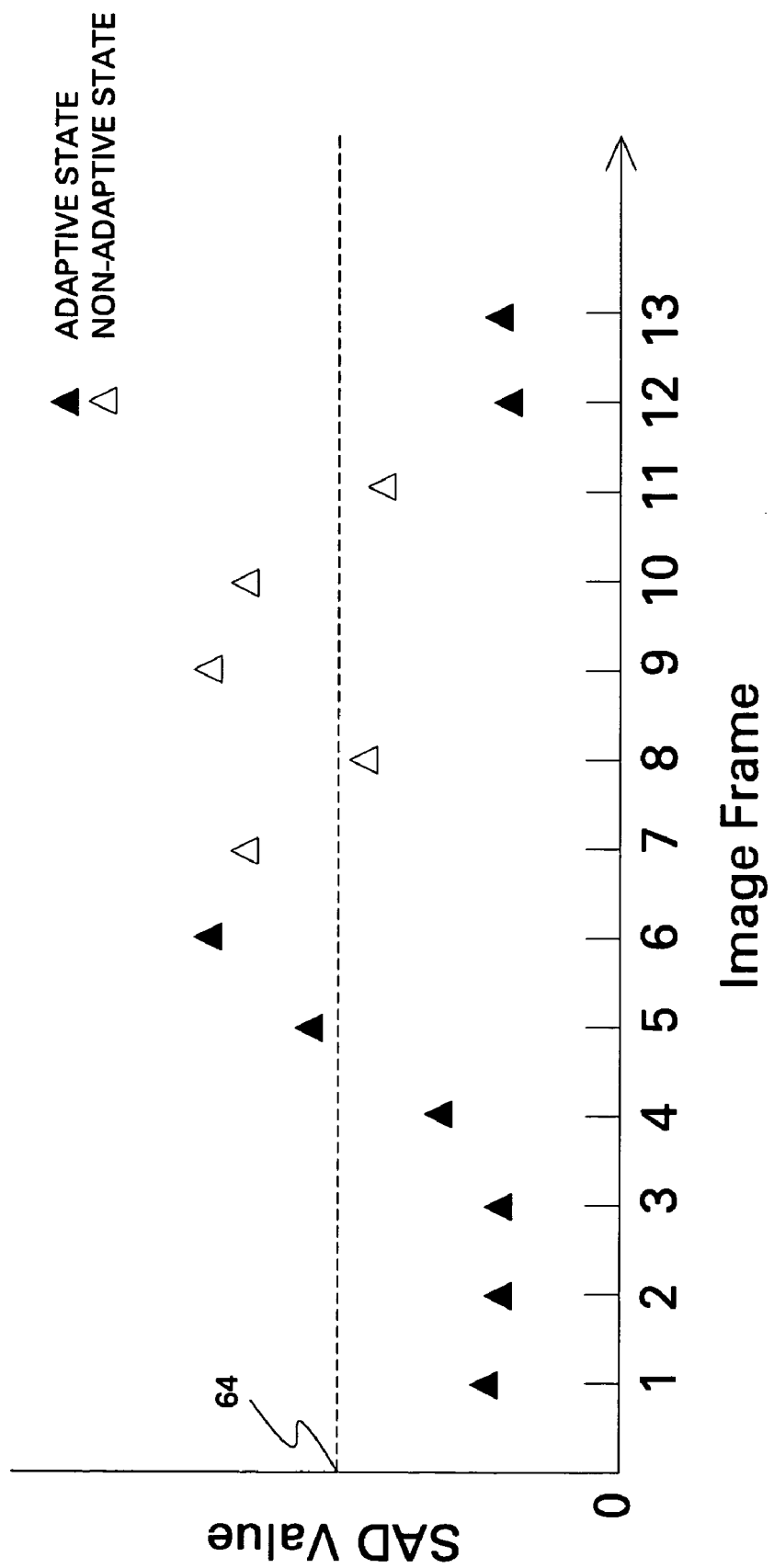
FIG. 3 is a graph illustrating a summed absolute difference value calculated over consecutive image frames.

FIG. 3 is a graph illustrating the SAD values for each image frame. The x-axis represents the image frames and the y-axis represents the SAD value. The threshold value is represented by reference numeral 64. When the relative motion is in a fast moving state, that is when the SAD value is greater than the threshold value, the adaptive beamformer is disabled. Similarly, when the relative motion is in a slow moving state that is, the SAD value is less than the threshold value, the adaptive beamformer is enabled.

Hysteresis can be used to eliminate rapid shifting of the system from the fast moving state to the slow moving state and back. The transition, for example, from the fast moving state to the slow moving state, is made only if the SAD value drops below the threshold value for at least A consecutive frames, where A is a suitably chosen small integer. Similarly, the transition from the slow moving state to the fast moving state is made only if the SAD value rises above the threshold value for at least B consecutive frames, where B is a suitably chosen small integer, not necessarily equal to A.

In a further embodiment, the adaptive beamformer is enabled and disabled based on a contact state between the transducer and the imaging subject. The pixel values in the sequence of image frames can be used to estimate whether the transducer is in contact with the imaging subject or not. When the transducer is in contact with the imaging subject, it is defined as the contacting state. When transducer is not in contact with the imaging subject, it is defined as the non-contacting state.

The contact state can be determined based on observing the image by the ultrasound system. The image is typically darker when the transducer is not in contact with the imaging subject than when it is in contact and is receiving signals. By calculating the average pixel value over a region of the image and comparing that average pixel value to a contact threshold level, the contact state is determined.

The contact state determination can be made more reliable against small random changes in average values by introducing hysteresis. The transition from one state to the other, for example, from the contacting to non-contacting state, is made only if the average pixel value drops below a contact threshold value for at least X consecutive frames, where X is a suitably chosen small integer. Similarly, the transition from the non-contacting to contacting state is made only if the average pixel value rises above the contact threshold value for at least Y consecutive frames, where Y is a suitably chosen small integer, not necessarily equal to X.

As described above, when the ultrasound system is in a contact state and a slow-moving state, the adaptive beamformer is enabled. In all other cases, adaptive beamformer is disabled.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for controlling an ultrasound system, the method comprising:
   estimating a relative motion between an array of transducer elements and an imaging subject;
   controlling an adaptive beamformer system in response to an estimation of the relative motion;
   wherein the controlling comprises:
   disabling the adaptive beamformer system when the relative motion is equal to or greater than a threshold value; wherein the disabling comprises switching the adaptive beamformer system to an OFF state; and
   enabling the adaptive beamformer system when the relative motion is smaller than the threshold value;

wherein the enabling comprises switching the adaptive beamformer system to an ON state.

2. The method of claim 1, further comprising
detecting a contact state between the transducer array and the imaging subject; and,
controlling the adaptive beamforming system responsive to the contact state.

3. The method of claim 2 wherein the controlling step comprises:
disabling the adaptive beamforming system when the transducer array is not in contact with the imaging subject; and
enabling the adaptive beamformer system when the transducer array is in contact with the imaging subject.

4. The method of claim 1, further comprising providing a user using the ultrasound system an indicator of a operative state of the adaptive beamformer system, and wherein in the indicator is presented to the user in at least one of a visual marker, audible signal or combinations thereof.

5. The method of claim 4 wherein the operative state of the adaptive beamformer system comprises disabled and enabled.

6. The method of claim 1, wherein the estimating step comprises generating a plurality of image frames of the imaging subject, the image frame comprising a plurality of pixels and each pixel having a corresponding pixel value;
determining a displacement in the image frame, wherein the displacement is determined by comparing the pixel value of at least one pixel in a first image frame and the pixel value of the one pixel in at least one subsequent image frame.

7. The method of claim 6, wherein the first image frame and the subsequent image frame are adjacent.

8. The method of claim 6, wherein the step of determining a displacement comprises calculating a summed absolute difference, wherein the summed absolute difference comprises the sum of the absolute value of a difference in pixel values of at least one pixel over a pair of image frames.

9. The method of claim 8, further comprising normalizing the summed absolute difference such that the value lies between zero and unity.

10. The method of claim 8, wherein the summed absolute difference of less than the threshold value indicate a first measure of motion.

11. The method of claim 8, wherein the summed absolute difference equal to or greater than the threshold value indicate a second measure of motion.

12. The method of claim 8, wherein prior to the step of calculating of summed absolute difference, pixel values in selected sets in each image frame are summed.

13. The method of claim 1, further comprising applying default beamforming time delays when the adaptive beamformer system is disabled.

14. The method of claim 1, wherein the step of controlling comprises using hysteresis in transitions between of a first measure of motion and a second measure of motion.

15. An automatically controlled ultrasound system comprising:
a adaptive beamformer system configured for generating the ultrasound beam; and
an array of transducer elements coupled to the adaptive beamformer system and configured for transmitting the ultrasound beam to an imaging subject and receiving reflected signals from the imaging subject;
a processing system configured for:
estimating a relative motion between the transducer array and an imaging subject;
controlling the adaptive beamformer system in response to the relative motion; wherein the controlling comprises:
disabling the adaptive beamformer system when the relative motion is equal to or greater than a threshold value; wherein the disabling comprises switching the adaptive beamformer system to an OFF state; and
enabling the adaptive beamformer system when the relative motion is smaller than the threshold value; wherein the enabling comprises switching the adaptive beamformer system to an ON state.

16. The ultrasound system of claim 15, wherein the processing system is further configured to:
determine a contact state between the transducer element and the imaging subject;
disable the beamforming system when the transducer is not in contact with the imaging subject; and
enable the adaptive beamformer system when the transducer is in contact with the imaging subject.

17. The ultrasound system of claim 15, further comprising a interface unit coupled to the processing system and configured for providing en indicator of a operative state of the adaptive beamformer system to a user using the ultrasound system.

18. The ultrasound system of claim 17, wherein the interface unit is configured to display an indicator when the adaptive beamformer system is disabled and when the adaptive beamformer system is enabled, wherein the indicator is displayed to a user using the ultrasound system.

19. The ultrasound system of claim 15, wherein the adaptive beamformer system further comprises:
a first plurality of connections between beamforming channels and the transducer elements configured to support a first aperture size of the transducer during the enable condition; wherein the first aperture is configured for high spatial sampling of ultrasound wavefronts; and
a second plurality of connections between beamforming channels and the transducer elements configured to support a second aperture size during a disable condition of the adaptive beamformer system, wherein the second aperture is configured for high focusing resolution.

20. The ultrasound system of claim 19, wherein the first plurality of connections are made in a 1.75 D or 2 D connection topology.

21. The ultrasound system of claim 19, wherein the second plurality of connections are made in a 1 D connection topology.

22. The ultrasound system of claim 19, wherein the second plurality of connections are made in a 1.5 D connection topology.

23. The ultrasound system of claim 16, wherein the processing system is further configured for applying default beamforming time delays when the adaptive beamformer system is disabled.

24. A system for automatically enabling and disabling a adaptive beamformer system configured for use in an ultrasound system, the system comprising:
means for estimating a relative motion between an array of transducer elements and an imaging subject; and,
means for controlling the adaptive beamformer system in response to an estimation of the relative motion; wherein the means for controlling comprises:
means for disabling the adaptive beamformer system when the relative motion is equal to or greater than a threshold value; wherein the disabling comprises switching the adaptive beamformer system to an OFF state; and, means for enabling the adaptive beamformer system when the relative motion is smaller than the threshold value; wherein the enabling comprises switching the adaptive beamformer system to an ON state.

25. The system of claim 24, further comprising means for determining a contact state between the transducer element and the imaging subject;

and means for controlling the adaptive beamformer system responsive to the contact state.

26. The system of claim 25, wherein the controlling step comprises:

means far disabling the adaptive beamforming system when the transducer is not in contact with the imaging subject; and means for enabling the adaptive beamformer system when the transducer is in contact with the imaging subject.

27. The system of claim 24, further comprising means for displaying an indicator indicating an operative state of the adaptive beamformer system, and wherein in the indicator is presented to a user in at least one of a visual marker, audible signal or combinations thereof to the operator using the ultrasound system.

28. The system of claim 27 wherein the operative state of the adaptive beamformer system comprises disabled and enabled.

29. The system of claim 28, wherein the means for estimating comprises means for generating a plurality of image frames of the imaging subject, the image frame comprising a plurality of pixels and each pixel having a corresponding pixel value;

means for determining a displacement in the image, wherein the displacement is determined by comparing the pixel value of at least one pixel in a first image frame and the pixel value of the one pixel in at least one subsequent image frame.

30. The system of claim 29, wherein the first image frame and the subsequent image frame are adjacent.

31. The system of claim 29, wherein the means for determining comprises means for calculating a summed absolute difference, wherein the summed absolute difference comprises the sum of the absolute value of a difference in pixel values of at feast one pixel over a pair of successive image frames.

32. The system of claim 31, further comprising means for normalizing the summed absolute difference.

33. The system of claim 24, further comprising means for applying default beamforming time delays when the adaptive beamformer system is disabled.

34. The system of claim 24, wherein means for estimating comprises means for using a hysteresis in a transition between a first measure of motion and a second measure of motion.

* * * * *